United States Patent
Arsenault et al.

(10) Patent No.: US 10,933,849 B2
(45) Date of Patent: Mar. 2, 2021

(54) SYSTEMS AND METHODS FOR RAPID CONVERGENCE ANTISKID INITIALIZATION

(71) Applicant: GOODRICH CORPORATION, Charlotte, NC (US)

(72) Inventors: Tyler Arsenault, Dayton, OH (US); Naison E Mastrocola, Goshen, CT (US)

(73) Assignee: Goodrich Corporation, Charlotte, NC (US)

( * ) Notice: Subject to any disclaimer, the term of this patent is extended or adjusted under 35 U.S.C. 154(b) by 236 days.

(21) Appl. No.: 16/224,196

(22) Filed: Dec. 18, 2018

(65) Prior Publication Data
US 2020/0130661 A1   Apr. 30, 2020

Related U.S. Application Data

(60) Provisional application No. 62/752,242, filed on Oct. 29, 2018.

(51) Int. Cl.
| | |
|---|---|
| *B60T 8/1761* | (2006.01) |
| *B60T 8/74* | (2006.01) |
| *B60T 8/32* | (2006.01) |
| *B60T 8/17* | (2006.01) |
| *B60T 8/172* | (2006.01) |
| *B60T 8/52* | (2006.01) |

(52) U.S. Cl.
CPC ........ *B60T 8/17616* (2013.01); *B60T 8/1703* (2013.01); *B60T 8/1725* (2013.01); *B60T 8/325* (2013.01); *B60T 8/52* (2013.01); *B60T 8/74* (2013.01)

(58) Field of Classification Search
None
See application file for complete search history.

(56) References Cited

U.S. PATENT DOCUMENTS

| | | | |
|---|---|---|---|
| 5,951,122 A | 9/1999 | Murphy | |
| 6,161,907 A * | 12/2000 | Luckevich | .......... B60T 8/17616 303/139 |
| 7,717,527 B1 * | 5/2010 | Griffith | ................. B60T 8/1703 303/126 |
| 7,837,279 B2 | 11/2010 | Salamat et al. | |

(Continued)

OTHER PUBLICATIONS

Lonbani et al., "Anti-Skid Braking Control System Design for Aircraft: Multi-Phase Schemes Approach", 5th IEEE International Conference on Models and Technologies for Intelligent Transportation Systems (MT-ITS), Jun. 2017, pp. 104-109. (Year: 2017).*

*Primary Examiner* — Todd Melton
(74) *Attorney, Agent, or Firm* — Snell & Wilmer L.L.P.

(57) ABSTRACT

An antiskid controller for controlling braking operation of a wheel of a vehicle based on an output signal provided by a wheel speed sensor coupled to the wheel may comprise a delay toggle, a switch logic for switching between an initial rate and a running rate, and a linear control used for calculating an antiskid correction signal, wherein the linear control receives one of the initial rate and the running rate, depending on a state of the switch logic. The linear control receives the initial rate upon initialization of the antiskid controller. The linear control receives the running rate after a predetermined duration or after the linear control has converged on a desired solution.

20 Claims, 6 Drawing Sheets

(56) References Cited

U.S. PATENT DOCUMENTS

| | | | |
|---|---|---|---|
| 9,085,285 B2* | 7/2015 | DeVlieg | B60T 8/1703 |
| 9,139,293 B2* | 9/2015 | Griffith | B60T 8/325 |
| 9,296,488 B2* | 3/2016 | McKeown | B60T 8/1703 |
| 9,725,161 B2* | 8/2017 | Cox | B64C 25/405 |

* cited by examiner

SYSTEMS AND METHODS FOR RAPID CONVERGENCE ANTISKID INITIALIZATION

CROSS REFERENCE TO RELATED APPLICATIONS

This application claims priority to, and the benefit of, U.S. Provisional Patent Application Ser. No. 62/752,242, entitled "RAPID CONVERGENCE ANTISKID INITIALIZATION," filed on Oct. 29, 2018. The '242 Application is hereby incorporated by reference in its entirety for all purposes.

FIELD

The present disclosure relates generally to the field of brake control systems, and more specifically to systems and methods for aircraft brake control.

BACKGROUND

Aircraft typically include a braking system operatively coupled to the wheels of the aircraft and configured to slow the wheels, and the aircraft, during, for example, landing or a rejected takeoff. Aircraft braking systems tend to utilize aircraft brake controllers, to control various aspects of the braking system For example, during a braking operation, the brake controllers may switch between a pressure controller and an antiskid controller. In this regard, as a pilot applies force to the brake pedals, the pressure or force applied at the brake is increased to decelerate the wheel and aircraft. As the pressure/force exceeds the braking condition supported by the tire/runway friction, the antiskid controller may become the dominant, such that the antiskid controller controls the brake pressure/braking force to prevent or reduce skidding. The time for the braking system to transition from pressure control to antiskid control can induce a deep initial skid.

SUMMARY

A system for controlling a braking force applied to a wheel of a vehicle is disclosed, comprising a brake controller having an input for receiving a brake force command indicative of a desired amount of brake force to be applied to the wheel, and an output for providing a brake force output command to a brake actuator and assembly which applies a brake force to the wheel based on the brake force output command, a wheel speed sensor, operatively coupled to the wheel, for measuring a speed of the wheel and providing an output signal indicative of the measured wheel speed, and a differential reference controller. The differential reference controller comprises a delay toggle, a switch logic for switching between an initial rate and a running rate, and a linear control used for calculating an antiskid correction signal, wherein the linear control receives one of the initial rate and the running rate, depending on a state of the switch logic.

In various embodiments, at least one of the initial rate and the running rate is a maximum rate of change which can occur in the measured wheel speed during a sampling period of the linear control.

In various embodiments, the delay toggle is configured to send a toggle signal to the switch logic to switch between the initial rate and the running rate.

In various embodiments, the running rate is received by the linear control in response to the toggle signal being received by the switch logic.

In various embodiments, the toggle signal is sent from the delay toggle to the switch logic a predetermined duration after the differential reference controller is enabled.

In various embodiments, the toggle signal is sent from the delay toggle to the switch logic in response to an error of the linear control decreasing below a threshold value.

In various embodiments, the initial rate is less than −10 meters per second squared.

In various embodiments, the running rate is greater than −9 meters per second squared.

A differential reference controller for controlling braking operation of a wheel of a vehicle based on an output signal provided by a wheel speed sensor coupled to the wheel is disclosed, the controller comprising a delay toggle, a switch logic for switching between an initial rate and a running rate, and a linear control used for calculating an antiskid correction signal, wherein the linear control receives one of the initial rate and the running rate, depending on a state of the switch logic.

In various embodiments, at least one of the initial rate and the running rate is a maximum rate of change which can occur in a measured wheel speed during a sampling period of the linear control.

In various embodiments, the delay toggle is configured to send a toggle signal to the switch logic to switch between the initial rate and the running rate.

In various embodiments, the running rate is received by the linear control in response to the toggle signal being received by the switch logic.

In various embodiments, the toggle signal is sent from the delay toggle to the switch logic a predetermined duration after the differential reference controller is enabled.

In various embodiments, the toggle signal is sent from the delay toggle to the switch logic in response to an error of the linear control decreasing below a threshold value.

In various embodiments, the initial rate is less than −10 meters per second squared.

In various embodiments, the running rate is greater than −9 meters per second squared.

A method of controlling a brake control system is disclosed, comprising receiving a measured wheel speed, controlling a force/pressure applied to a brake based upon the measured wheel speed, enabling an antiskid controller, receiving an initial rate for use by a linear control, calculating an antiskid correction signal using the initial rate, receiving a running rate for use by the linear control, and calculating the antiskid correction signal using the running rate, wherein a magnitude of the initial rate is greater than a magnitude of the running rate.

In various embodiments, the method further comprises sending a toggle signal from a delay toggle to a switch logic, wherein the running rate is received in response to the toggle signal being received by the switch logic.

In various embodiments, the toggle signal is sent from the delay toggle to the switch logic a predetermined duration after the antiskid controller is enabled.

In various embodiments, the initial rate is less than −10 meters per second squared and the running rate is greater than −9 meters per second squared.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The accompanying drawings illustrate various embodiments employing the principles described herein and are a part of this specification. The illustrated embodiments are meant for description only, and they do not limit the scope of the claims, and in which:

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein described without departing from the scope and spirit of the disclosure. Thus, the detailed description herein is presented for purposes of illustration only and not of limitation.

Systems and methods disclosed herein may be useful for detection of wheel skid and/or for prevention of wheel lockup. A wheel skid may occur in response to the braking force or braking pressure applied to a wheel exceeding the traction available to that wheel. In various embodiments, the disclosed systems and methods may use a measured wheel speed to determine when antiskid should be in control (dominant) and various vehicle parameters to initialize internal antiskid math (e.g., integrators). In various embodiments, when the antiskid control is enabled, a pressure correction may be calculated using a linear controller to converge on a desired solution. Reducing the time lag/delay between the moment the antiskid control is enabled and when the antiskid controller converges on an appropriate solution may reduce depth of the initial skid. The systems and methods disclosed herein may allow the antiskid controller to better control the wheel speed and the braking pressure/force, which may improve antiskid efficiency and shorten stop distances for the brake control algorithm.

A brake control system, as described herein may reduce delay between a skid condition being detected and antiskid control achieving optimum control of the braking. Reducing the time lag/delay between pressure control inducing the initial skid and antiskid control achieving control may reduce depth of the initial skid. This may allow antiskid to better control the wheel speed and pressure/force or better track the peak friction conditions for the tire/runway. This effect may improve antiskid efficiency and shorten stop distances for the brake control algorithm.

Although the embodiments herein are described with reference to braking systems used in connection with aircraft, such embodiments are provided for example only as it is contemplated that the disclosures herein have applicability to other vehicles, such as automobiles and/or vehicles with brakes.

Figure 1A:
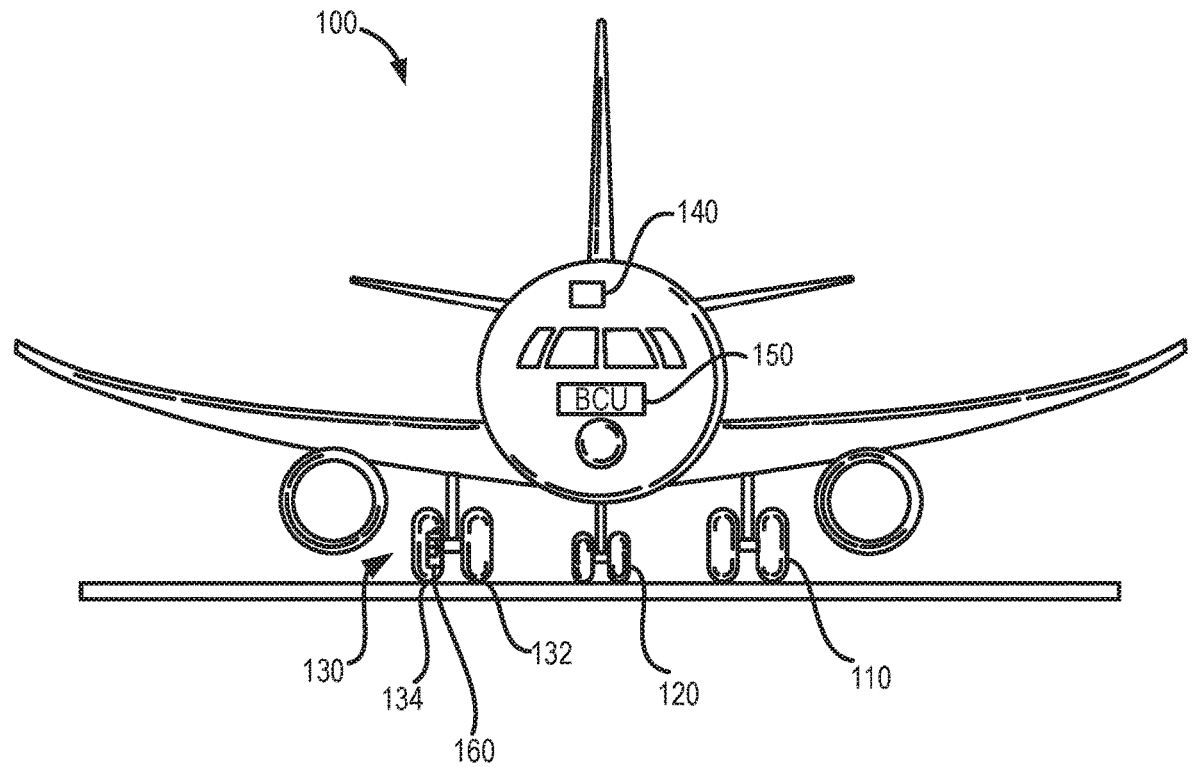
FIG. 1A illustrates an aircraft having multiple landing gear and brakes, in accordance with various embodiments.

With reference to FIG. 1A, an aircraft 100 on runway 102 is illustrated, in accordance with various embodiments. Aircraft 100 includes multiple landing gear systems, including a landing gear 110, landing gear 120, and landing gear 130. Landing gear 110, landing gear 120, and landing gear 130 each include one or more wheel assemblies. For example, landing gear 130 includes an inner wheel assembly 132 and an outer wheel assembly 134. Landing gear 110, landing gear 120, and landing gear 130 support the aircraft 100 when the aircraft 100 is not flying, thereby allowing the aircraft 100 to take off, land, and taxi without damaging the aircraft 100. In various embodiments, landing gear 120 may be a nose landing gear of aircraft 100. The wheels of the nose landing gear may differ from the wheels of the other landing gear in that the nose wheels may not include a brake. In various embodiments, landing gear 110, landing gear 120, and landing gear 130 are operationally retractable into the aircraft 100 when the aircraft 100 is in flight and/or airborne.

In various embodiments, the aircraft 100 further includes an avionics unit 140, which includes one or more controllers (e.g., processors) and one or more tangible, non-transitory memories capable of implementing digital or programmatic logic. In various embodiments, for example, the one or more controllers are one or more of a general purpose processor, digital signal processor (DSP), application specific integrated circuit (ASIC), field programmable gate array (FPGA), or other programmable logic device, discrete gate, transistor logic, or discrete hardware components, or any various combinations thereof or the like. In various embodiments, avionics unit 140 controls, at least various parts of, the flight of, and operation of various components of, the aircraft 100. For example, avionics unit 140 controls various parameters of flight, such as an air traffic management systems, auto-pilot systems, auto-thrust systems, crew alerting systems, electrical systems, electronic checklist systems, electronic flight bag systems, engine systems flight control systems, environmental systems, hydraulics systems, lighting systems, pneumatics systems, traffic avoidance systems, trim systems, and the like.

Figure 1B:
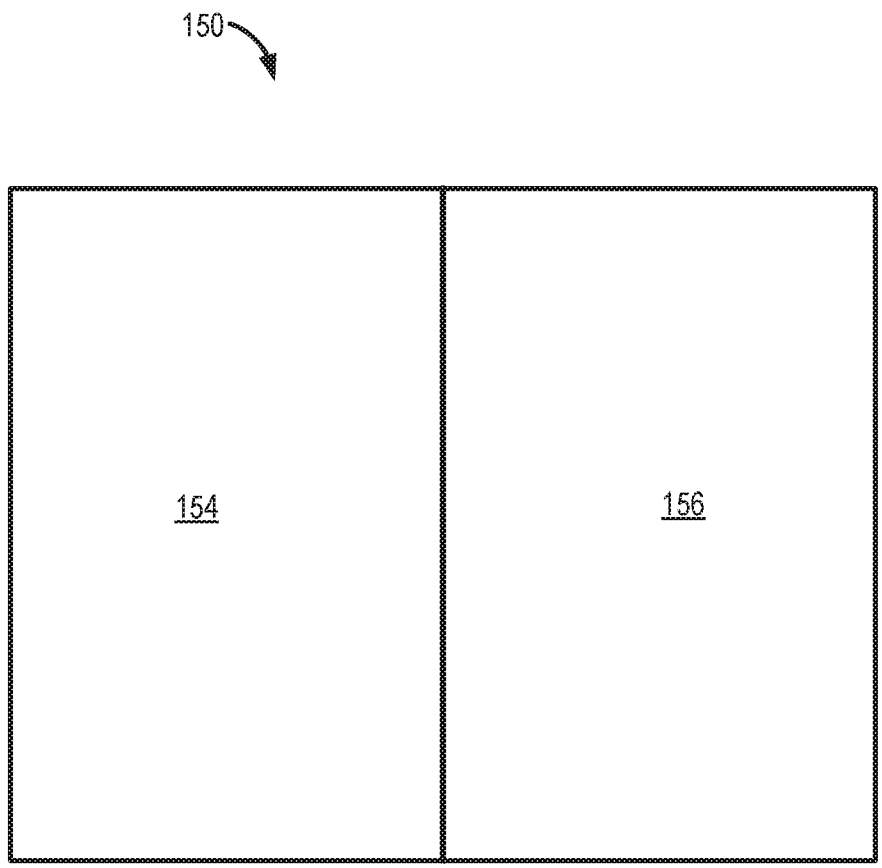
FIG. 1B illustrated a block diagram of a brake control unit of the aircraft of FIG. 1A, in accordance with various embodiments.

In various embodiments, aircraft 100 further includes a brake control unit (BCU) 150. With brief reference now to FIG. 1B, the BCU 150 includes one or more controllers 154 (e.g., processors) and one or more tangible, non-transitory memories 156 capable of implementing digital or programmatic logic. In various embodiments, for example, the one or more controllers 154 are one or more of a general purpose processor, DSP, ASIC, FPGA, or other programmable logic device, discrete gate, transistor logic, or discrete hardware components, or any various combinations thereof or the like, and the one or more memories 156 store instructions that are implemented by the one or more controllers 154 for performing various functions, such as monitoring a health status of a servo valve, as will be discussed herein. In various embodiments, the BCU 150 controls, at least various parts of, the braking of the aircraft 100. For example, the BCU 150 controls various parameters of braking, such as manual brake control, automatic brake control, antiskid braking, locked wheel protection, touchdown protection, park capability, gear retraction braking, and the like.

Returning to FIG. 1A, aircraft 100 further includes one or more brakes coupled to each wheel assembly. For example, a brake 160 is coupled to the outer wheel assembly 134 of landing gear 130 of aircraft 100. In operation, brake 160 applies a braking force to outer wheel assembly 134 upon receiving a brake command, such as from BCU 150. In various embodiments, outer wheel assembly 134 of the landing gear 130 of aircraft 100 comprises any number of wheels.

Figure 2:
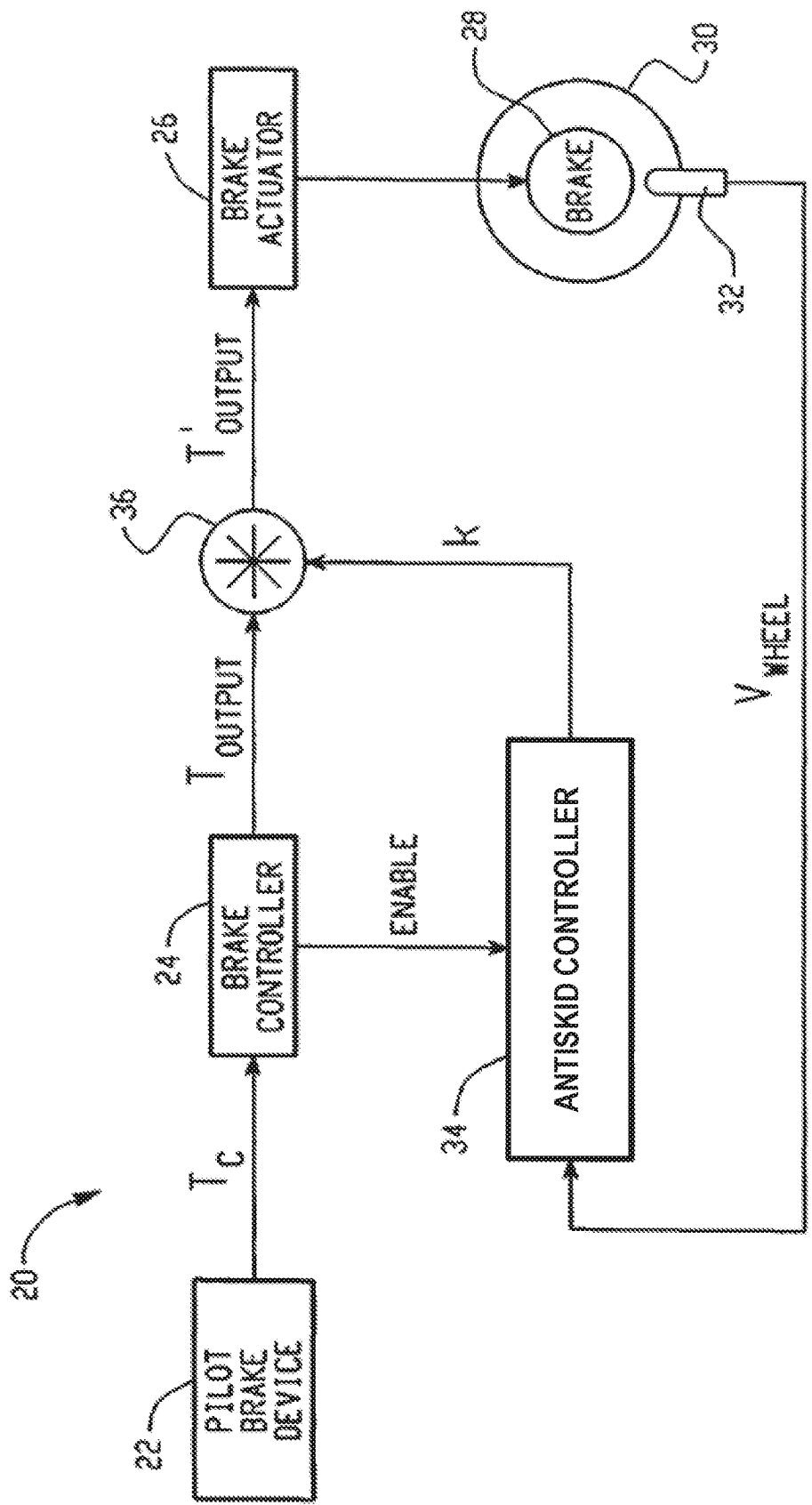
FIG. 2 is a block diagram of a brake control system including an antiskid and wheel lock differential reference controller, in accordance with various embodiments.

For sake of simplicity, the brake control system 20 as shown in FIG. 2 represents the basic unit for providing brake control of a single wheel (left or right). However, it will be appreciated that control for the other wheel(s) can be provided via corresponding systems 20 or in a single system incorporating the same inventive principles. Moreover, in various embodiments the present disclosure provides brake control in connection with an aircraft. Nevertheless, it will be appreciated that the brake control system with differential reference antiskid control according to the present disclosure has utility for virtually any type of vehicle and is not limited necessarily to brake control for aircraft.

The system 20 includes a pilot brake device 22 for providing operator brake control. In addition, the system 20 includes a conventional brake controller 24. The controller 24 is designed to provide a control signal $T_{output}$ to a brake actuator 26 included in the system 20. The brake actuator 26 may be any conventional type actuator (e.g., hydraulic, pneumatic or electromechanical) for applying pressure to the brake material (not shown) in a brake assembly 28. The brake assembly 28 in turn provides braking action to a wheel 30 by exerting a braking torque or force on the wheel 30 as is conventional. The wheel 30 is coupled to the aircraft (or other vehicle) via a conventional structure (not shown).

The system 20 further includes a wheel speed sensor 32 which measures the speed of the wheel 30. The speed of the wheel may be based on the measured angular velocity of the wheel multiplied by its radius to provide linear wheel speed as is known. The wheel speed sensor 32 may be any conventional sensor (e.g., optical encoder based, etc.) which provides an output signal $V_{wheel}$ indicative of the measured speed of the wheel 30.

The signal $V_{wheel}$ is input to a controller (also referred to herein as an antiskid differential reference controller) 34 included in the system 20. The controller 34 uses the measured wheel speed $V_{wheel}$ to maintain the deceleration of wheel 30 to a target threshold. The target deceleration threshold 34 is implemented in software using the selection logic defined in 34. In response to the antiskid controller 34 detecting that the wheel deceleration, based upon the measured wheel speed $V_{wheel}$, has exceeded a specified limit, the controller 34 may command more or less braking force applied via the brake actuator 26 to cause the wheel to reach the desired wheel deceleration. In this regard, the controller 34 may provide an antiskid signal "k" which may vary in value depending on the measured wheel speed $V_{wheel}$. Value 'k' may modify the $T_{output}$ to the brake actuator such that $V_{wheel}$ tracks the target deceleration value.

If the deceleration of wheel 30 begins to exceed a predefined desired deceleration value for optimum braking, the antiskid correction antiskid correction signal k from the controller 34 modifies $T_{output}$ to reduce the amount of braking force applied by the brake actuator 26. In the event the deceleration of wheel 30 eventually exceeds a predefined maximum deceleration value (e.g., as a result of an ice patch or the like), the antiskid correction signal k from the controller 34 will decrease $T'_{output}$ commensurately such that $V_{wheel}$ tracks the target deceleration. This effectively releases the brake force applied by the brake actuator 26. The brake force commanded by the controller 34 again estimates the deceleration of wheel 30 in an effort to provide braking at the desired optimum deceleration.

The controller 34 receives an ENABLE signal from the brake controller 24 so as to activate the controller 34 during a braking event (e.g., activation of the pilot brake device 22). Consequently, the controller 34 may be disabled during non-braking events.

Generally describing the operation of the system 20, the pilot brake device 22 comprises a pedal, an autobrake switch, or equivalent thereof. During a braking event, the pilot of the aircraft activates the pilot brake device 22 by pushing the pedal (or its equivalent). The depression of the pedal is converted to an electrical signal (brake torque command signal $T_c$) which is provided to the controller 24. The value of the command signal $T_c$ is indicative of the degree of depression of the pedal, and is related to the amount of braking force requested by the pilot as is conventional. The controller 24 receives the command signal $T_c$ and outputs the brake control signal $T_{output}$ which is related to the command signal $T_c$. Concurrently, the controller 24 enables the controller 34 via the ENABLE signal.

Figure 3:
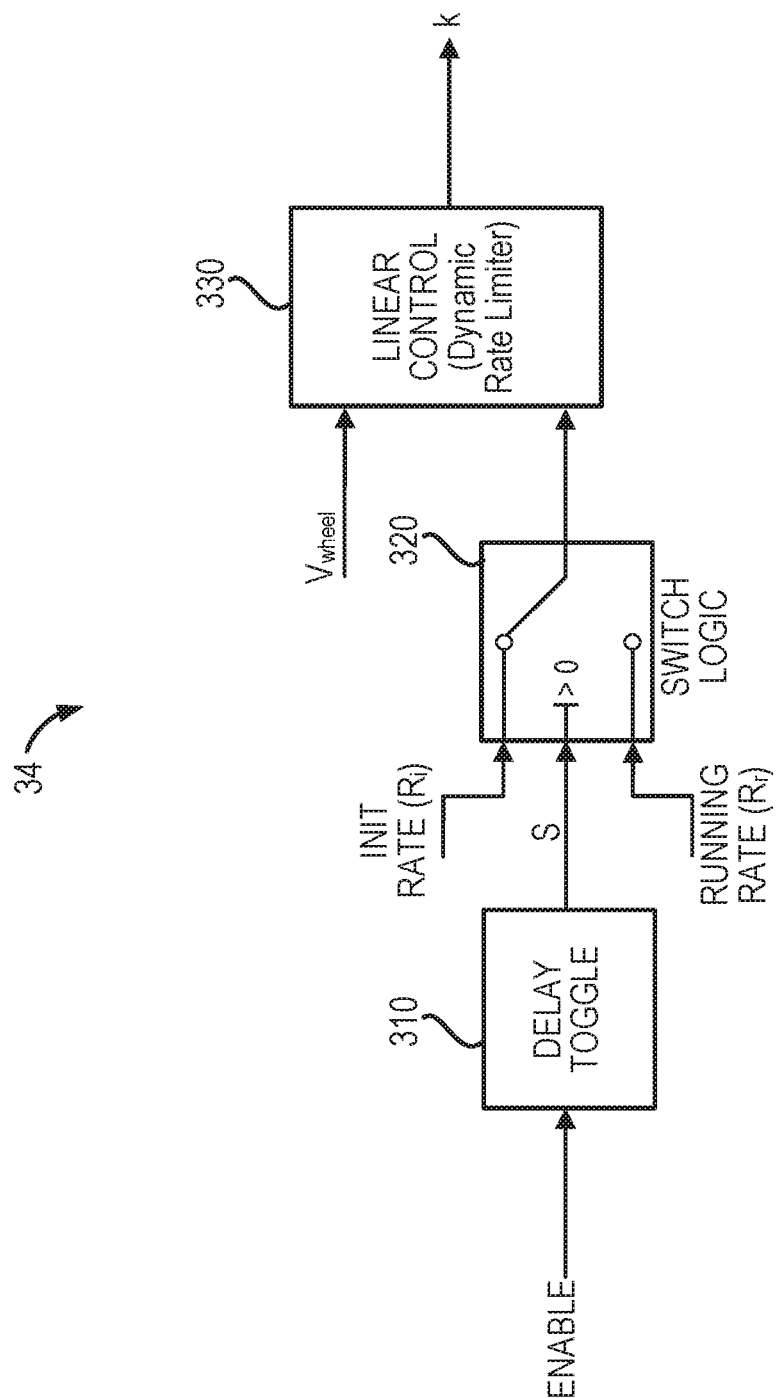
FIG. 3 is a block diagram of an antiskid and wheel lock differential reference controller, in accordance with various embodiments.

FIG. 3 is a detailed block diagram of a portion of the controller 34, in accordance with various embodiments. The controller 34 may include a delay toggle 310, a switch logic 320. The delay toggle 310 receives the ENABLE signal to start a timer for a predetermined duration, such as one second or two seconds for example. The predetermined duration may be chosen based upon known conditions of the vehicle, such as mass of the vehicle for example, and parameters used by the linear control, such as the time step value used in integrating functions for example. After the predetermined duration, the delay toggle 310 outputs a toggle signal S which causes the switch logic 320 to switch from an initial rate $R_i$ to a running rate $R_r$. The linear control 330 receives either the initial rate $R_i$ or the running rate $R_r$, depending on the state of switch logic 320. In this regard, upon initialization of controller 34, switch logic 320 passes initial rate $R_i$ to linear control 330 for the predetermined duration. After the predetermined duration the linear control receives the running rate $R_r$.

In various embodiments, instead of outputting toggle signal S after a predetermined duration, delay toggle 310 may output toggle signal S in response to linear control 330 converging upon a desired solution. For example, delay toggle 310 may output toggle signal S in response to an error calculated by linear control 330 reducing below a threshold value.

The magnitude of the initial rate $R_i$ is greater than the magnitude of the running rate $R_r$. In various embodiments, the initial rate $R_i$ and the running rate $R_r$ are fixed values. For example, the initial rate $R_i$ may be about −30 meters per second squared (−30 m/s$^2$) and the running rate $R_r$ may be about −6 meters per second squared (−6 m/s$^2$). In various embodiments, the initial rate $R_i$ is less than −10 meters per second squared (less than −10 m/s$^2$). In various embodiments, the initial rate $R_i$ may be between −15 meters per second squared (−15 m/s$^2$) and −50 meters per second squared (−50 m/s$^2$). In various embodiments, the running rate $R_r$ may be between −1 meters per second squared (−1 m/s$^2$) and −9 meters per second squared (−9 m/s$^2$).

The linear control 330 receives the measured wheel speed $V_{wheel}$ and the rate (i.e., either the initial rate $R_i$ or the running rate $R_r$, depending on the state of switch logic 320)

and outputs a antiskid correction signal k whose value ranges from 0 to 1. The particular value of k depends on how close the deceleration of measured wheel speed $V_{wheel}$ is to the desired deceleration of measured wheel speed $V_{wheel}$ for optimum braking, as determined from the measured wheel speed $V_{wheel}$ and the rate ($R_i$ or $R_r$). The linear control 330 may receive the measured wheel speed $V_{wheel}$ and may limit the rate of change of the measured wheel speed $V_{wheel}$ based upon either the initial rate $R_i$ or the running rate $R_r$, depending on the state of switch logic 320. In various embodiments, linear control 330 may comprise a proportional, integral, derivative (PID) controller. By using initial rate $R_i$ upon initialization of linear control 330 the linear control 330 may converge more quickly to generate the optimal antiskid correction signal k, as opposed to a slower convergence if only running rate $R_r$ were used. In various embodiments, a rate of change of the wheel speed $V_{wheel}$ is limited based upon the maximum rate of change ($R_i$ or $R_r$) which can occur in the wheel speed $V_{wheel}$ during a sampling period.

Figure 4:
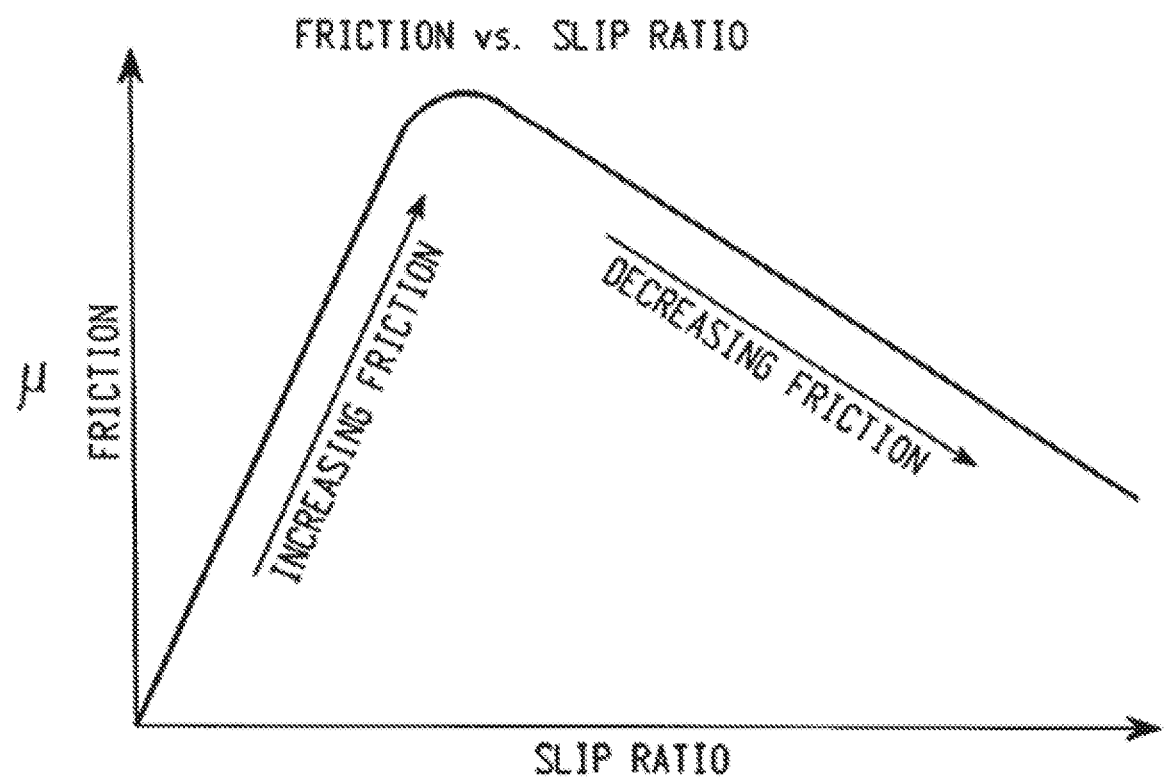
FIG. 4 is a mu-slip curve, in accordance with various embodiments.

In various embodiments, with combined reference to FIG. 3 and FIG. 4, linear control 330 may converge upon a desired deceleration of measured wheel speed $V_{wheel}$ based upon the known μ-slip curve, or the curve represented by the coefficient of friction μ between the wheel and the running surface on a vertical axis and the slip ratio on the horizontal axis, as illustrated in FIG. 4. A slip ratio of zero is when the wheel is not skidding while a slip ratio equal to one represents a fully locked wheel. In various embodiments, convergence may be reached at the peak of the μ-slip curve. In various embodiments, linear control 330 converges upon a desired deceleration of measured wheel speed $V_{wheel}$ using known methods (e.g., PID control or the like).

Figure 5:
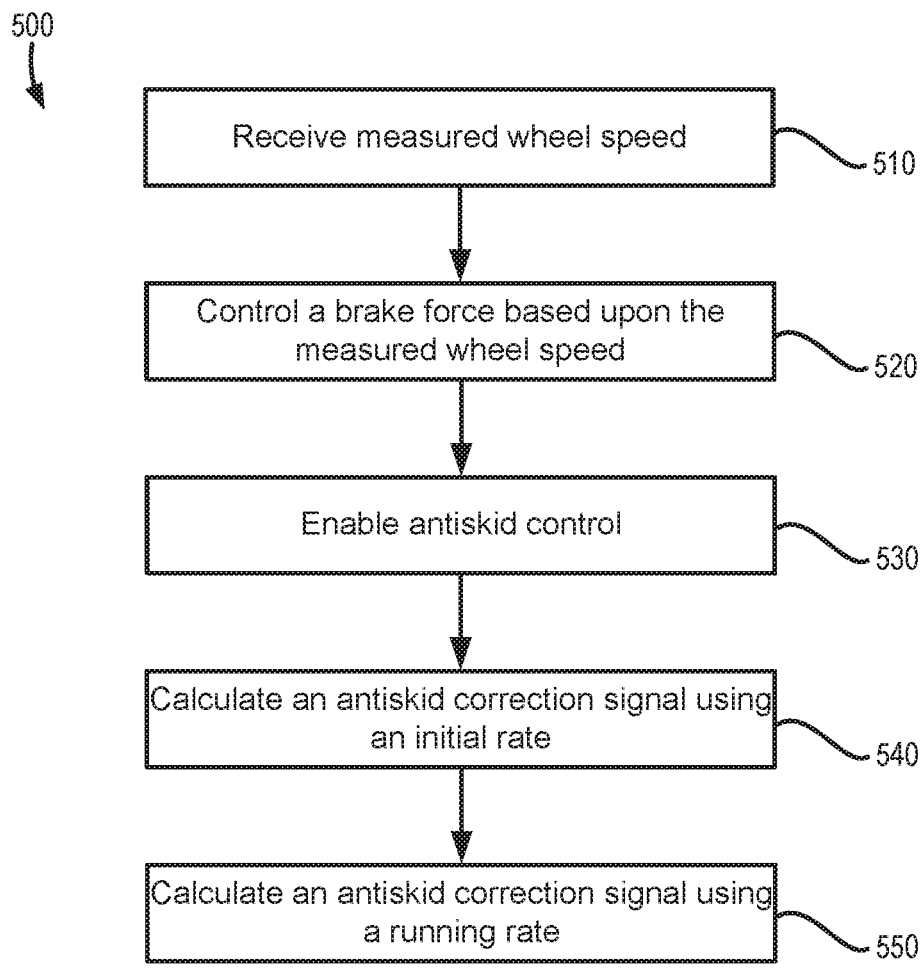
FIG. 5 is a flowchart illustrating a method of controlling a brake system, in accordance with various embodiments.

With reference to FIG. 5, a method 500 for controlling a brake control system is provided, in accordance with various embodiments. Method 500 includes receiving a measured wheel speed (step 510). Method 500 includes controlling a brake force based upon the measured wheel speed (step 520). Method 500 includes enabling an antiskid control (step 530). Method 500 includes calculating an antiskid correction signal using an initial rate (step 540). Method 500 includes calculating an antiskid correction signal using a running rate (step 550).

With combined reference to FIG. 2, FIG. 3, and FIG. 5, step 510 may include receiving, by controller 34, wheel speed $V_{wheel}$. Step 520 may include controlling, by controller 24, a force/pressure applied to brake assembly 28 based upon wheel speed $V_{wheel}$. Step 530 may include enabling controller 34. Controller 34 may be enabled in response to receiving ENABLE signal from controller 24. Step 540 may include receiving, by linear control 330, initial rate $R_i$ for use by linear control 330 in calculating antiskid correction signal k. Step 540 may include calculating, by controller 34, antiskid correction signal k using the initial rate $R_i$. Step 550 may include receiving, by linear control 330, running rate $R_r$ for use by linear control 330 in calculating antiskid correction signal k. Step 550 may include calculating, by controller 34, antiskid correction signal k using the running rate $R_r$.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure.

The scope of the disclosure is accordingly to be limited by nothing other than the appended claims, in which reference to an element in the singular is not intended to mean "one and only one" unless explicitly so stated, but rather "one or more." It is to be understood that unless specifically stated otherwise, references to "a," "an," and/or "the" may include one or more than one, and that reference to an item in the singular may also include the item in the plural. All ranges and ratio limits disclosed herein may be combined.

Moreover, where a phrase similar to "at least one of A, B, and C" is used in the claims, it is intended that the phrase be interpreted to mean that A alone may be present in an embodiment, B alone may be present in an embodiment, C alone may be present in an embodiment, or that any combination of the elements A, B, and C may be present in a single embodiment; for example, A and B, A and C, B and C, or A and B and C. Different cross-hatching is used throughout the figures to denote different parts, but not necessarily to denote the same or different materials.

The steps recited in any of the method or process descriptions may be executed in any order and are not necessarily limited to the order presented. Furthermore, any reference to singular includes plural embodiments, and any reference to more than one component or step may include a singular embodiment or step. Elements and steps in the figures are illustrated for simplicity and clarity and have not necessarily been rendered according to any particular sequence. For example, steps that may be performed concurrently or in different order are only illustrated in the figures to help to improve understanding of embodiments of the present, representative disclosure.

Any reference to attached, fixed, connected, or the like may include permanent, removable, temporary, partial, full and/or any other possible attachment option. Additionally, any reference to without contact (or similar phrases) may also include reduced contact or minimal contact. Surface shading lines may be used throughout the figures to denote different parts or areas, but not necessarily to denote the same or different materials. In some cases, reference coordinates may be specific to each figure.

Systems, methods, and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments, whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements, but it may also include other elements not expressly listed or inherent to such process, method, article, or apparatus.

What is claimed is:

1. A system for controlling a braking force applied to a wheel of a vehicle, comprising:
   a brake controller having an input for receiving a brake force command indicative of a desired amount of brake force to be applied to the wheel, and an output for providing a brake force output command to a brake actuator and assembly which applies a brake force to the wheel based on the brake force output command;
   a wheel speed sensor, operatively coupled to the wheel, for measuring a speed of the wheel and providing an output signal indicative of the measured wheel speed; and
   a differential reference controller, comprising:
      a delay toggle;
      a switch logic for switching between an initial rate and a running rate; and
      a linear control used for calculating an antiskid correction signal, wherein the linear control receives one of the initial rate and the running rate, depending on a state of the switch logic.

2. The system of claim 1, wherein at least one of the initial rate and the running rate is a maximum rate of change which can occur in the measured wheel speed.

3. The system of claim 1, wherein the delay toggle is configured to send a toggle signal to the switch logic to switch between the initial rate and the running rate.

4. The system of claim 3, wherein the running rate is received by the linear control in response to the toggle signal being received by the switch logic.

5. The system of claim 3, wherein the toggle signal is sent from the delay toggle to the switch logic a predetermined duration after a skid condition is detected.

6. The system of claim 3, wherein the toggle signal is sent from the delay toggle to the switch logic in response to an error of the linear control decreasing below a threshold value.

7. The system of claim 1, wherein the initial rate is less than −10 meters per second squared.

8. The system of claim 1, wherein the running rate is greater than −9 meters per second squared.

9. A differential reference controller for controlling braking operation of a wheel of a vehicle based on an output signal provided by a wheel speed sensor coupled to the wheel, the differential reference controller comprising:
   a delay toggle;
   a switch logic for switching between an initial rate and a running rate; and
   a linear control used for calculating an antiskid correction signal, wherein the linear control receives one of the initial rate and the running rate, depending on a state of the switch logic.

10. The differential reference controller of claim 9, wherein at least one of the initial rate and the running rate is a maximum rate of change which can occur in a measured wheel speed.

11. The differential reference controller of claim 9, wherein the delay toggle is configured to send a toggle signal to the switch logic to switch between the initial rate and the running rate.

12. The differential reference controller of claim 11, wherein the running rate is received by the linear control in response to the toggle signal being received by the switch logic.

13. The differential reference controller of claim 11, wherein the toggle signal is sent from the delay toggle to the switch logic a predetermined duration after a skid condition is detected.

14. The differential reference controller of claim 11, wherein the toggle signal is sent from the delay toggle to the switch logic in response to an error of the linear control decreasing below a threshold value.

15. The differential reference controller of claim 9, wherein the initial rate is less than −10 meters per second squared.

16. The differential reference controller of claim 9, wherein the running rate is greater than −9 meters per second squared.

17. A method of controlling a brake control system, comprising:
   receiving a measured wheel speed;
   controlling a force/pressure applied to a brake based upon the measured wheel speed;
   enabling an antiskid controller;
   receiving an initial rate for use by a linear control;
   calculating an antiskid correction signal using the initial rate;
   receiving a running rate for use by the linear control; and
   calculating the antiskid correction signal using the running rate, wherein a magnitude of the initial rate is greater than a magnitude of the running rate.

18. The method of claim 17, further comprising sending a toggle signal from a delay toggle to a switch logic, wherein the running rate is received in response to the toggle signal being received by the switch logic.

19. The method of claim 18, wherein the toggle signal is sent from the delay toggle to the switch logic a predetermined duration after the antiskid controller is enabled.

20. The method of claim 17, wherein the initial rate is less than −10 meters per second squared and the running rate is greater than −9 meters per second squared.

* * * * *